(12) United States Patent
Carr

(10) Patent No.: US 6,408,633 B1
(45) Date of Patent: Jun. 25, 2002

(54) INTERFACING OF THERMAL STORAGE SYSTEMS WITH AIR CONDITIONING UNITS

(75) Inventor: Peter Carr, Cary, NC (US)

(73) Assignee: Instatherm Company, Cary, NC (US)

( * ) Notice: Subject to any disclaimer, the term of this patent is extended or adjusted under 35 U.S.C. 154(b) by 0 days.

(21) Appl. No.: 09/923,843

(22) Filed: Aug. 7, 2001

Related U.S. Application Data

(60) Provisional application No. 60/223,816, filed on Aug. 8, 2000.

(51) Int. Cl.[7] ............... F25D 11/00; F25D 17/02; F28D 5/00
(52) U.S. Cl. ............... 62/99; 62/310; 62/430; 62/244; 165/104.11
(58) Field of Search ............ 62/310, 201, 99, 62/430, 434, 239, 244, 173; 165/10, 43, 48.1, 104.11; 222/129; 422/22, 24

(56) References Cited

U.S. PATENT DOCUMENTS

| | | | |
|---|---|---|---|
| 3,747,362 A | | 7/1973 | Mercer |
| 4,296,770 A | | 10/1981 | Rice |
| 4,922,998 A | * | 5/1990 | Carr .................. 62/430 X |
| 5,054,540 A | | 10/1991 | Carr |
| 5,056,588 A | * | 10/1991 | Carr .................. 165/10 |
| 5,168,724 A | | 12/1992 | Gilbertson et al. |
| 5,277,038 A | * | 1/1994 | Carr .................. 62/434 |
| 5,871,041 A | | 2/1999 | Rafalovich et al. |

* cited by examiner

Primary Examiner—Chen-Wen Jiang
(74) Attorney, Agent, or Firm—Alston & Bird LLP

(57) ABSTRACT

Efficient apparatus and methods are disclosed for interfacing active thermal stores, or cooling loops, to a secondary water loop for decreasing the temperature of an airflow by providing a continuously regenerating water loop that directs chilled water onto a thermally conductive heat exchanger, said loop further comprising supplying water for the loop by collecting water from the heat exchanger.

71 Claims, 6 Drawing Sheets

INTERFACING OF THERMAL STORAGE SYSTEMS WITH AIR CONDITIONING UNITS

CROSS-REFERENCE TO RELATED APPLICATIONS

This application claims the benefit of U.S. Provisional Application No. 60/223,816, filed Aug. 8, 2000.

FIELD OF THE INVENTION

The present invention relates generally to cost-effective methods and apparatuses for interfacing a thermal storage system with an existing or new air conditioning system. More specifically, the present invention relates to an efficient method and apparatus for using a recycled water loop as a coolant fluid to augment an existing cooling system.

BACKGROUND OF THE INVENTION

The present invention is directed to a simple and cost-effective method for interfacing a thermal storage system with an existing or new air conditioning unit to produce cooling system performance benefits.

Thermal storage units and systems are known. However, integrating such units and systems into a fully functional air conditioning system has provided the field with significant challenges. Three basic methods are traditionally used to accomplish this integration. First, air coupled systems are used whereby cool air charges this cool storage media and warm air is passed over a cool storage media to be cooled when the thermal storage system is discharged. See, for example, U.S. Pat. No. 4,922,998. Second, a secondary fluid is used to both charge a cool storage reservoir and to discharge the cool storage reservoir. Here an additional heat exchanger or the heater core (with the hot engine coolant valved off) is used as the air cooling means. See, for example, U.S. Pat. No. 5,277,038. In a special embodiment of this, an evaporator having (in addition to the fins in intimate contact with passages for evaporating refrigerant) a second set of passages also is in intimate contact with the aforementioned fins. A heat exchange fluid, such as an ethylene glycol/water mixture is caused to flow between a cool storage system and through this second set of evaporator passages. The heat exchange fluid and the refrigerant passages is interleaved to maximize heat transfer from the heat exchange fluid to the evaporating refrigerant during the charge. Note that essentially all heat transfer from the store is carried by fin conductivity between the two sets of passages. For the discharge cycle, cold fluid is passed through this special evaporator to remove heat from the air flowing over the fins. Third, a separate refrigeration loop is used that is suitably valved to evaporate refrigerant in passages within the storage reservoir and cool (charge) the contents of the store. A heat exchange fluid that can be caused to flow through the store is used on discharge to transfer heat (using a heat exchanger) from the air in the conditioned volume to the store.

In air coupled systems large volumes of air must be moved over the thermal storage system in a manner that does not restrict airflow. This usually means that the relatively large cool store has to be in close proximity to the system evaporator, which can present difficulties with respect to available space relative to the size of the components involved. A secondary fluid system certainly provides the flexibility of location, but adds another loop to the system as well as at least one more heat exchanger. The separate refrigerant loop adds a heat exchanger to the store and necessitates redistribution of refrigerant into added high pressure a/c lines. These additional components complicate installation and operation, and allow for potentially undesirable oil migration.

SUMMARY OF THE INVENTION

According to one preferred embodiment, the present invention is directed to a method for cooling an air stream. In a discharge cycle, a thermal storage reservoir is provided having an inlet and an outlet, said reservoir preferably comprising a phase change material. A thermally conductive heat exchanger having an inlet and an outlet is provided, with the inlet and outlet directing the flow of a heat exchange fluid through the heat exchanger. A primary water loop is provided having an amount of water directed through a conduit to the thermal storage reservoir inlet and away from the reservoir through the reservoir outlet, such that said water temperature decreases as the water is directed from the reservoir outlet. A fluid disperser, having a disperser inlet and a disperser outlet, is provided in communication with the conduit such that water in the water loop is directed from the reservoir to the dispenser inlet. Water is then dispersed from the conduit through the disperser outlet and onto the surface of the heat exchanger. Excess water from the heat exchanger surface as well as condensation from the heat exchanger (depending on ambient conditions) is collected and reclaimed in a collector and directed to the reservoir to continuously feed the water loop. Finally, an airflow is provided having a first temperature in the direction of the heat exchanger. The airflow moves past the heat exchanger such that the air, after passing the heat exchanger, has a second temperature lower that the first temperature.

In another embodiment, the present invention is directed to an apparatus for cooling air comprising a thermal storage reservoir having an inlet and an outlet, the reservoir preferably comprising a phase change material. In a discharge cycle, a thermally conductive heat exchanger is provided having an outer surface and an inlet and an outlet, said inlet and outlet directing the flow of a heat exchange fluid into and out from the heat exchanger. A primary water loop having an amount of water directed through a conduit inlet to the thermal storage reservoir inlet and away from the reservoir outlet is in communication with the reservoir, such that said water temperature decreases as the water is directed away from the reservoir outlet and through the conduit in the direction of the heat exchanger. A fluid disperser having a disperser inlet and a disperser outlet is provided in communication with the conduit such that water in the water loop is directed from the reservoir outlet through the conduit to the disperser inlet. A device such as a blower is provided for creating airflow having a first temperature, the airflow directed in the direction of the disperser and past the heat exchanger such that the airflow has a second temperature after passing the heat exchanger that is less than the first temperature. A collector for collecting and reclaiming water from the outer surface of the heat exchanger is in communication with the conduit inlet to provide a continuous feed of water into the water loop.

In yet another embodiment, the present invention is directed to a method for cooling an air stream. A primary refrigerant loop is provided comprising a heat exchanger, and preferably, a compressor and condenser. A secondary water loop, preferably an open water loop, is provided having an amount of water directed through the heat exchanger, such that the water temperature decreases as the water is directed away from the heat exchanger. A fluid disperser is provided having a disperser inlet and a disperser outlet. The disperser is provided in communication with the second conduit such that water in the secondary water loop is directed away from the heat exchanger to the disperser inlet. Water is dispersed from the conduit through the disperser outlet and onto a thermally conductive water contacting surface located proximate to, and preferably downstream from the disperser outlet. An airflow having a first temperature is then directed in the direction of the water contacting surface and past the water contacting surface, such that the airflow, after passing the water contacting surface, has a second temperature lower that the first temperature. An amount of water is collected and reclaimed for the water loop from the surface of the water-contacting surface and directed through the water loop to the second reservoir inlet on the reservoir. Optionally, a thermal storage reservoir can be placed in communication with either or both of the primary refrigerant loop and the secondary water loop.

In still another embodiment, the present invention is directed to an apparatus for cooling air comprising a refrigerant loop in communication with a water loop, preferably an open water loop. A primary refrigerant loop is provided comprising a first conduit in communication with a heat exchanger, compressor and condenser, with an amount of refrigerant circulating through the primary refrigerant loop. A secondary water loop is provided having an amount of water directed through a second conduit to the heat exchanger and to a fluid disperser, such that said water temperature decreases as the water is directed away from the heat exchanger. A thermally conductive water contacting surface is located proximate to the disperser for receiving water dispersed thereon from the disperser outlet and onto the surface of the water contacting surface. A blower is provided for creating an airflow in the direction of the water contacting surface and past the water contacting surface. The airflow has a first temperature from the blower and is directed such that the airflow, after passing the water contacting surface, has a second temperature lower that the first temperature. A collector is positioned proximate to the water contacting surface for collecting and reclaiming water from the surface of the water contacting surface. The collector is in communication with the secondary water loop inlet. Optionally, a thermal storage reservoir can be placed in communication with either or both of the primary refrigerant loop and the secondary water loop.

BRIEF DESCRIPTION OF THE DRAWINGS

Figure 1:
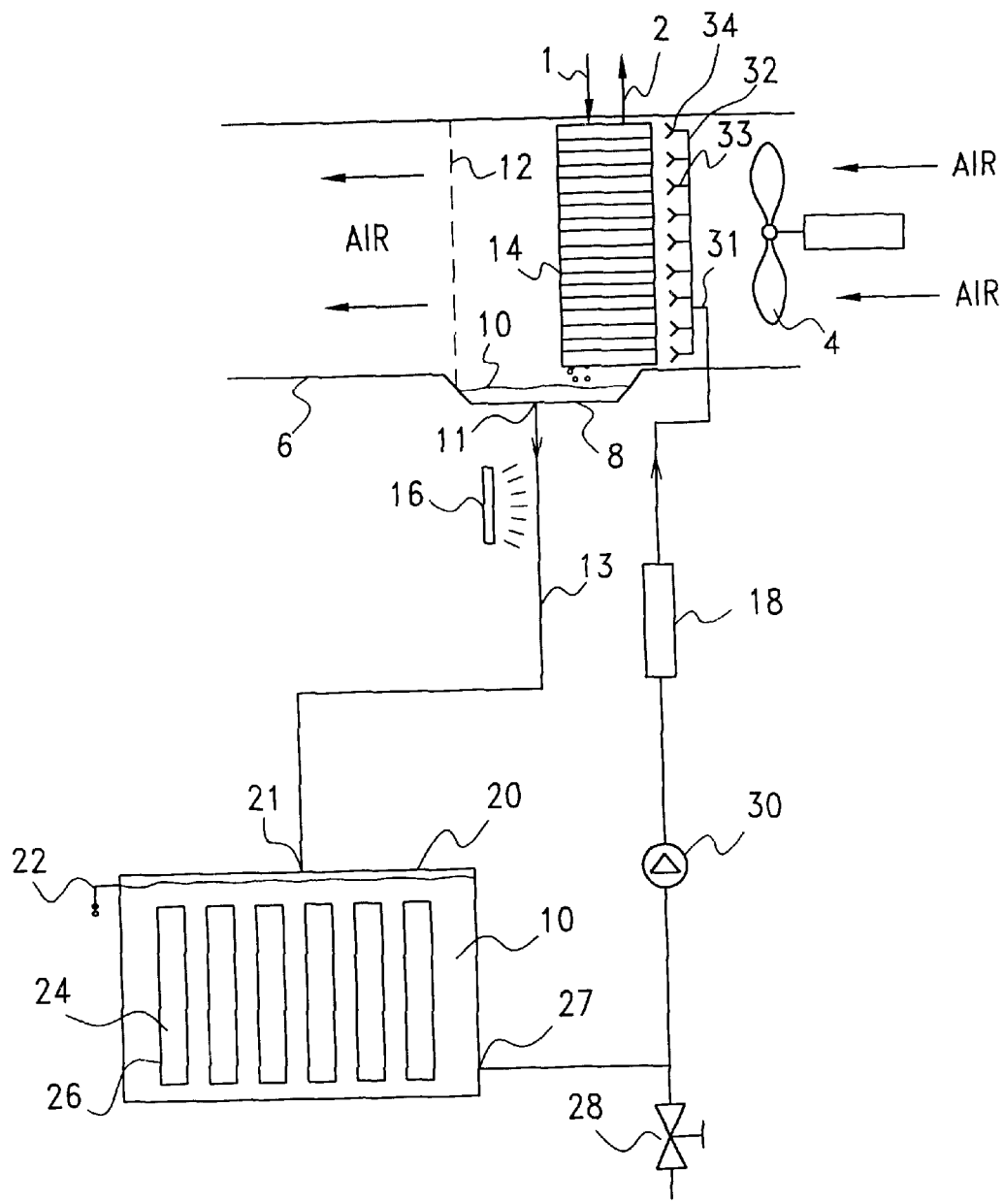
Figure 2:
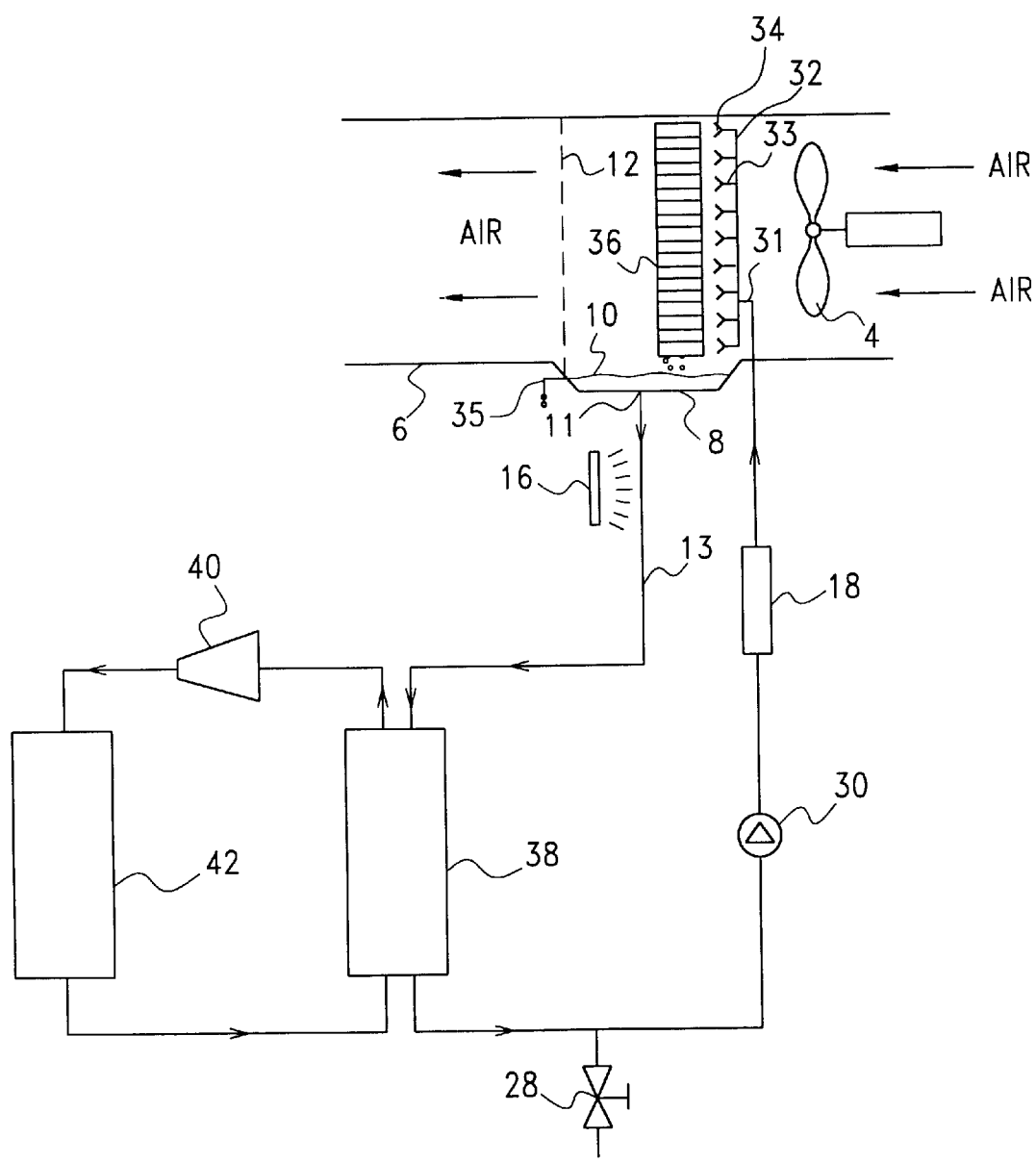
Figure 3:
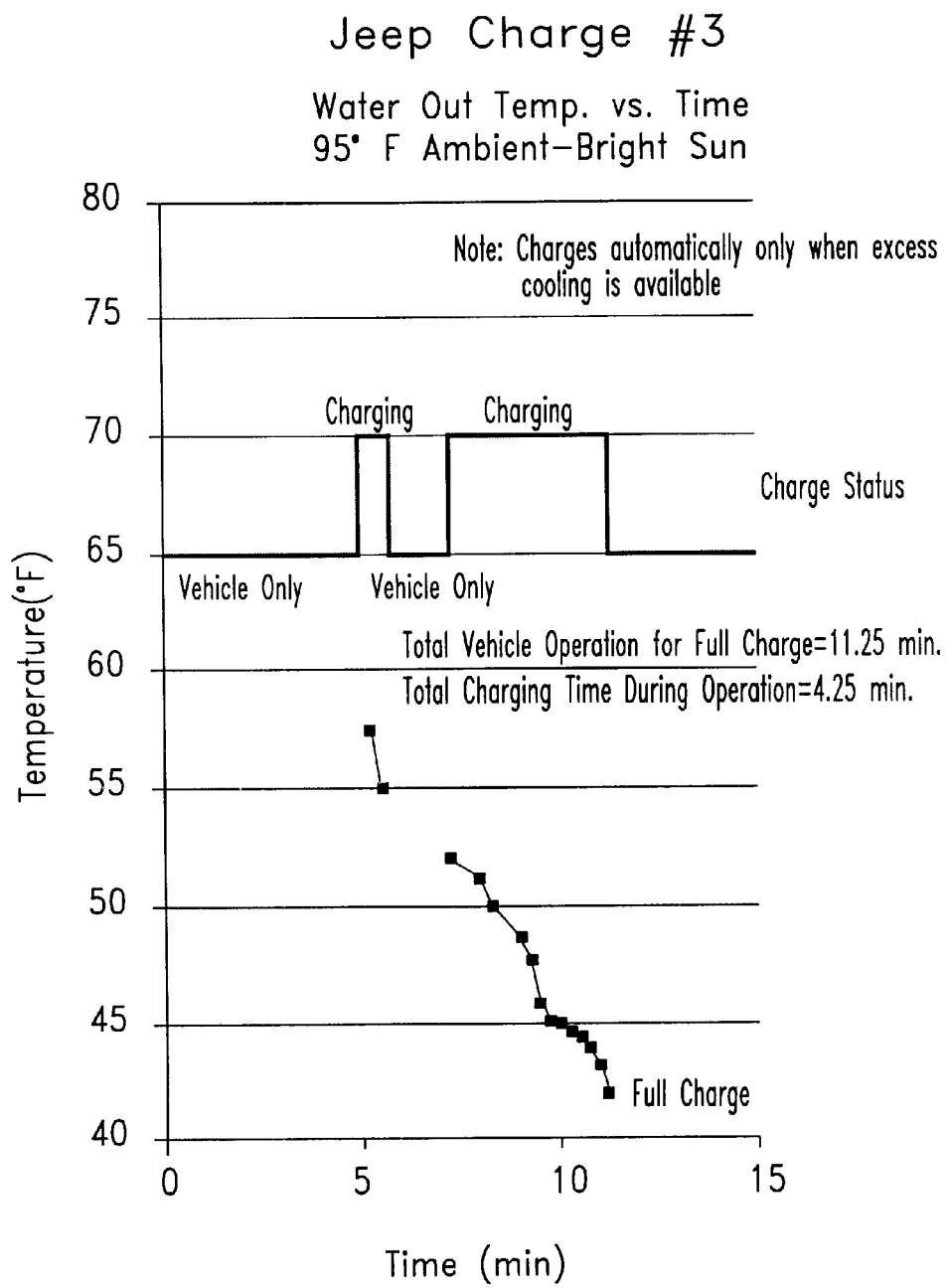
Figure 4:
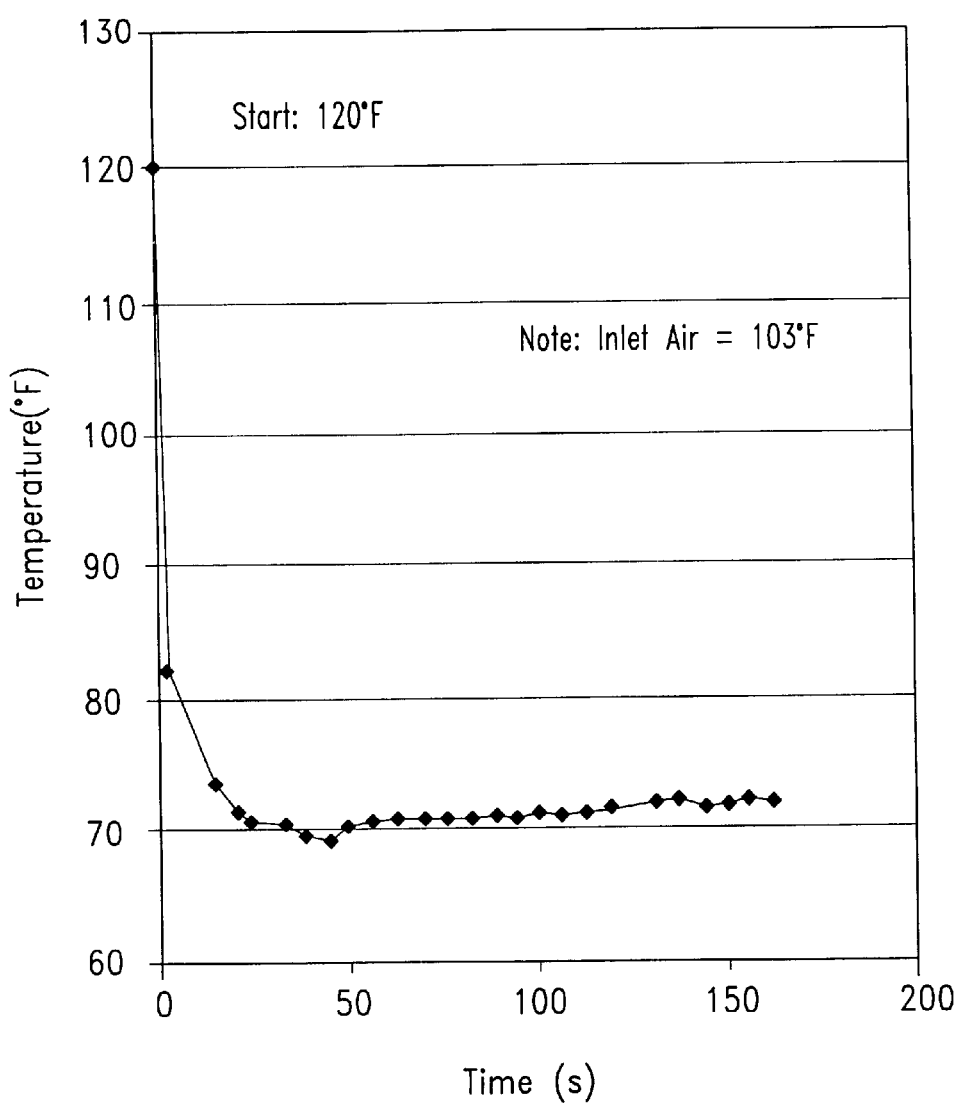
Figure 5:
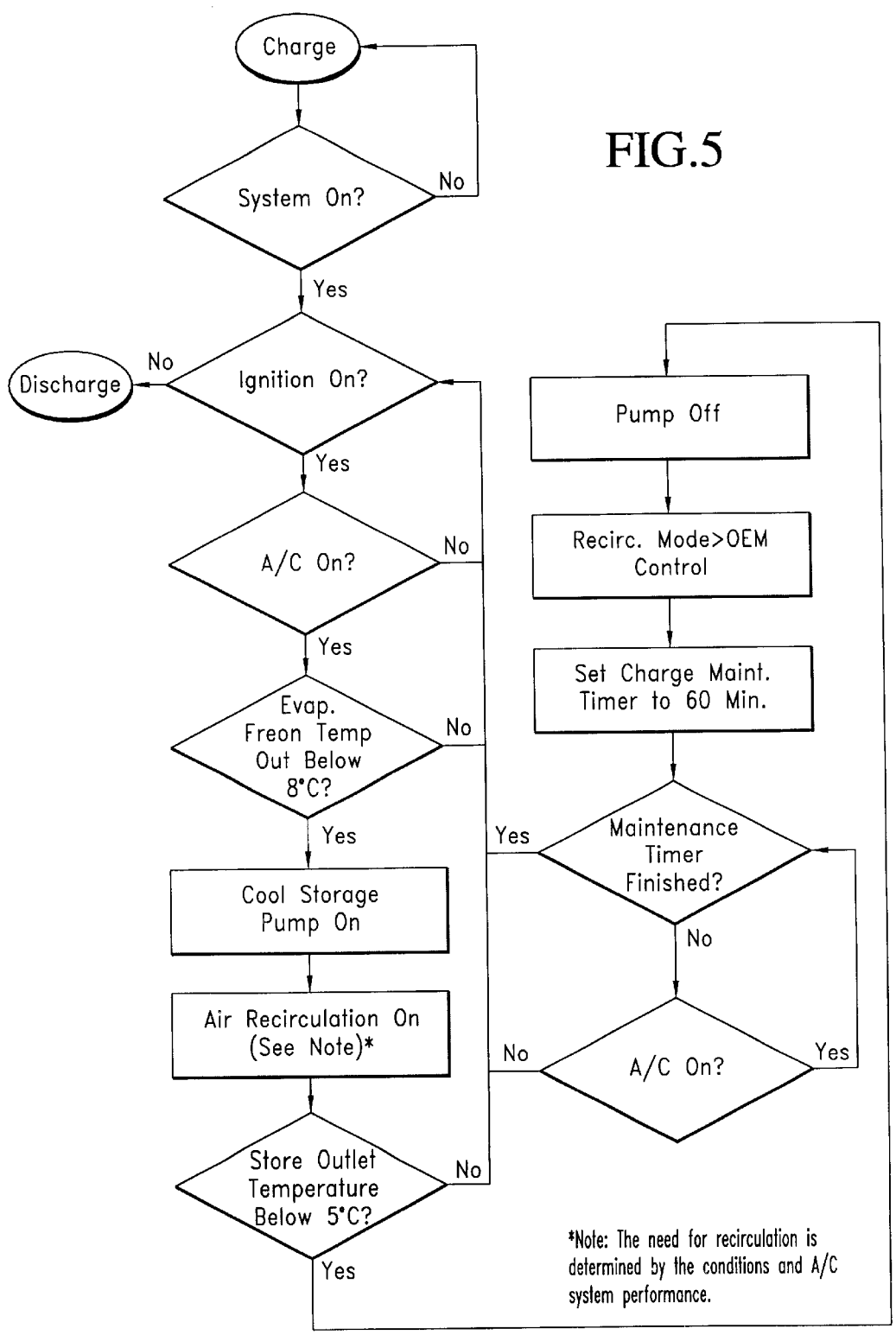
Figure 6:
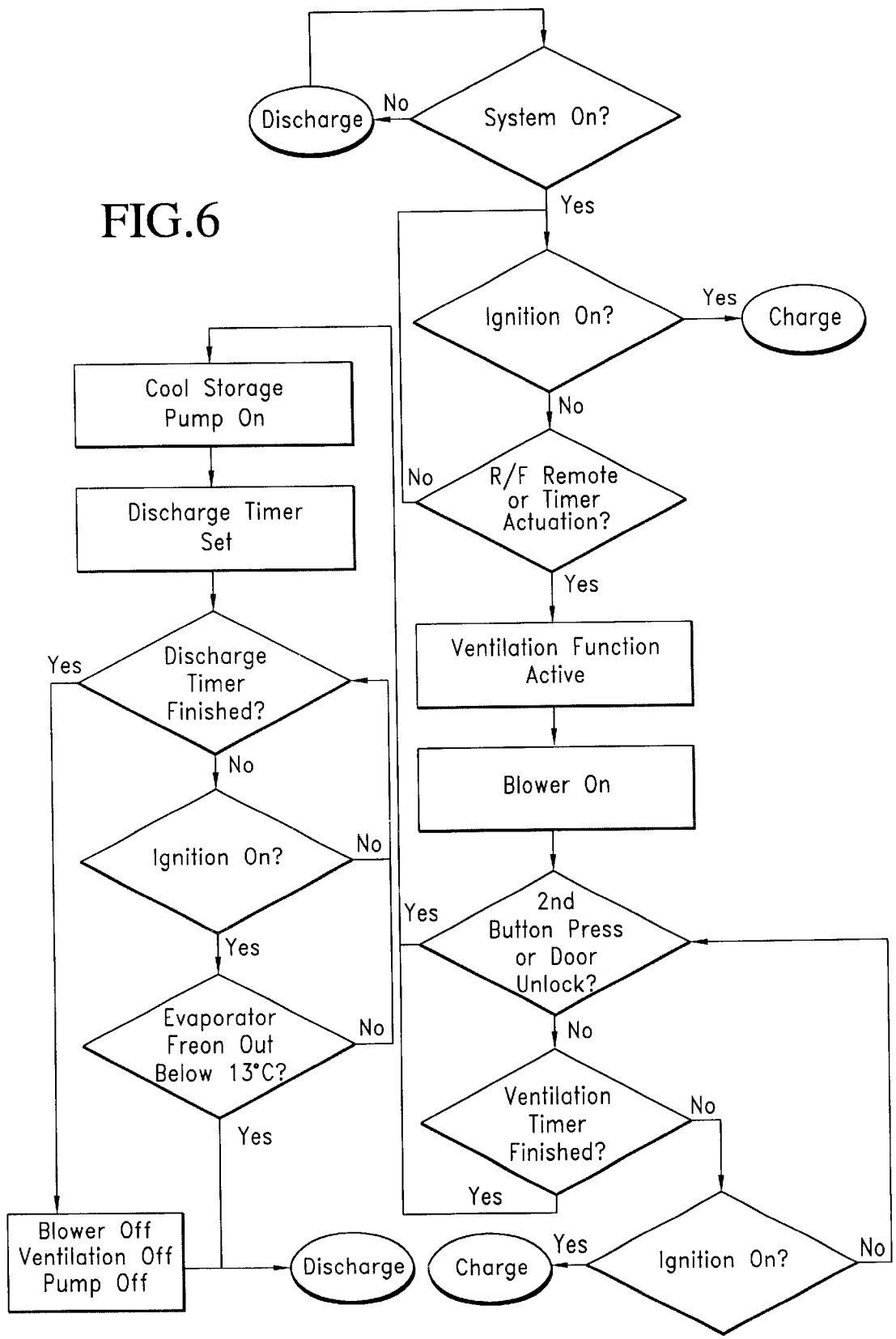

Having thus described the invention in general terms, reference will now be made to the accompanying drawings, which are not necessarily drawn to scale, and wherein:

FIG. 1 is a schematic view of one embodiment of the present invention incorporating a cool storage system into a standard air conditioning loop;

FIG. 2 is a schematic view of one embodiment of the present invention wherein the water loop is in an open loop as a secondary fluid in a secondary fluid air conditioning system;

FIG. 3 is a chart showing the charge results of one embodiment of the present invention installed in a vehicle air conditioning system;

FIG. 4 is a chart showing the discharge results of one embodiment of the present invention installed in a vehicle air conditioning system;

FIG. 5 is a flow chart showing the logic sequence for the charge operation of one method of the present invention; and FIG. 6 is a flow chart showing the logic sequence for the discharge operation of one method of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in FIG. 1, according to one embodiment of the invention, the present invention is directed to a simple and effective means of incorporating a cool storage system into a standard air conditioning loop. FIG. 1 shows an apparatus comprising a standard air conditioning cooling coil 14 with refrigerant inlet 1 and outlet 2. The coil 14 is mounted in an air duct 6. It should be noted that, while expanding refrigerant gas is commonly used to transfer heat in the cooling coil 14, cooled liquid can also be effectively used. The cooling coil 14 is mounted over, or is adjacent to, a condensate tray 8. The condensate tray 8 is suitably sized to handle the water 10 that circulates when the system is activated. A water distributor 32 is positioned to deliver a distributed water flow 34 over the surface of the cooling coil 14. The present invention contemplates the use of any device capable of delivering a flow or stream of water or water vapor. Such apparatuses include, for example, one or more flexible or fixed rods or tubes with openings directing water or vapor streams to sections of the coil. A blower 4 and an optional water droplet eliminator 12, downstream of the cooling coil, complete the components in the air stream. The droplet eliminator is preferably a meshed component, such as a screen.

An optional ultraviolet light 16 is shown in the water line, immediately downstream of the condensate tray. Ultraviolet lights are one widely used means of eliminating harmful bacteria in water. The light could be mounted at any desired position depending upon the design and space constraints of the particular system, such as within the thermal store 20 itself, or in the air duct 6 downstream of the cooling coil, for example. The light is optional since it is typically difficult for harmful bacteria to grow in flowing water systems with continual replenishment from condensation. Similarly, an optional water filter 18 is shown downstream of pump 30. The filter can be located elsewhere in the water loop, as desired, or in the thermal store itself, or may not be needed at all if the intake air is clean enough. The thermal store 20 is shown to contain thermal storage material 24 in containers that yield a heat exchange surface between the thermal storage material and the circulating water. Any thermal storage material with a phase change temperature above the freezing point of water and below that of the desired cooled air temperature is contemplated. For example, a gas hydrate formed from refrigerant 134a and water with a sealed tube phase change temperature of approximately 50° F. is an ideal candidate, but other gas hydrates could also be used, as could waxes and hydrocarbons with appropriate melting points. Salt hydrates and Glauber salts could also find applicability. The system is not limited to these examples. A volume of water alone could also form the thermal storage material. If water alone is used, the containers and the associated heat exchange surface are not necessary. An overflow drain 22 is provided at the desired water level in the store to remove excess water accumulated in the system by condensation of water from the air at the cooling coil. The drain could be located elsewhere in the system, such as, for example in the tray 8. Drain valve 28 is provided to drain water from the system if the system encounters freezing conditions and the system itself, or individual system components, are not specifically designed to accommodate the expansion of the water. Finally, pump 30 is incorporated into the system for water circulation.

In one preferred embodiment the system operates as follows. To charge the thermal store, refrigerant from the air conditioning system flows into cooling coil 14 through line 1, absorbing heat and then flows out of the cooling coil through line 2 and returns to the air conditioning system compressor and condenser (not shown) where the absorbed heat is released. Pump 30 is then activated to circulate water 10 around the thermal storage loop. This water flows into the dispenser 32 through the dispenser inlet 31 and exits through the dispenser outlet 33 as a distributed stream 34 that passes over the cooling coil (heat exchanger) 14 where it is cooled. If the blower 4 is also in operation, then the air will also be cooled by the cooling coil to provide conditioned air exiting from duct 6. If the cooling coil temperature is below the dew point of the incoming air, then additional water will also condense onto the cooling coil. This cooled circulating water, plus any added condensed water, drains off the cooling coil into condensate tray 8. The collected water flows out of the condensate tray 8 through the condensate tray outlet 11 and into conduit 13, and is irradiated by UV radiation emitted from an ultraviolet light 16 to eliminate any harmful bacteria. Next, the water enters the thermal store 20 at the thermal store inlet 21 and flows over heat exchange surfaces 26 behind which the thermal storage material 24 lies. The thermal storage material 24 loses heat to the water and the somewhat warmed water flows out of the thermal store from thermal store outlet 27 through pump 30. The flowing water has filterable impurities removed by filter 18, and finally flows back to distributor 32. The cycle is then repeated. Since condensed water can be continually added to the system water inventory, an overflow discharge 22 from the store drains excess water from the loop. Finally, drain valve 28 remains closed during operation but can be used to drain the system of water if the possibility of freeze damage exists. It is understood that the cooling coil described above performs the function of a heat exchanger.

According to the present invention, the cooling coil is made from a thermally conductive material to assure the efficient thermal transfer about its surface. In this way, the disperser need not effect a uniform coverage of water flow of the surface of the cooling coil to achieve a superior airflow temperature reduction. Preferred thermally conductive materials include but are not limited to aluminum, aluminum alloys, copper, copper alloys, etc.

In one preferred embodiment, the present invention enables the discharge of cooled air without operating the standard compressor-based air conditioning system. To discharge a charged system to provide cooled air, without operating the standard compressor based air conditioning package, the following actions are required according to FIG. 1. Blower 4 is activated and pump 30 is turned on. Water 10 then circulates from the condensate tray 8 past the optional ultraviolet light 16 into the thermal store 20. As the water flows through the store 20, it contacts the heat exchange surface 26 and gives up heat to the thermal storage material 24. The cooled water exits the thermal store, passes through the pump 30 and filter 18, and flows through disperser 32. The distributed water 34 from the dispenser is deposited onto the cooling coil 14 surface. This cooled water cools the air passing over it. As mentioned above, due to the thermally conductive nature of the coil (heat exchanger), the coil surface is cooled conductively in areas that the water does not physically reach, allowing the entire coil to work to cool the flowing air. In the event that water droplets are carried into the exiting air duct, a screen 12 can be inserted to allow the air to pass through, but direct the water droplets back to the condensate tray 8. While the above describes a discharge, when the standard compressor-based air conditioning package is not operational, the cool storage can also be used to augment the cooling from the active compressor based system when it cannot keep up with the load, or has just been started. Again, it should be noted that even on discharge, if the cooled air exiting cooling coil 14 is below the dew point of the incoming air, then condensed water will be added to the water inventory 10 and, if produced in excess, will then subsequently drain from the excess water overflow 22. Conversely, if the water circulating over cooling coil 14 is too warm to cool the incoming air to its dew point, some evaporative cooling will occur. Water will be lost from the inventory in this situation, but will be typically replenished from condensation during the next charge cycle.

As shown in FIG. 2, a secondary fluid air conditioning system is depicted with water in an open loop as the secondary fluid. In this embodiment the cooling effect is created by a vapor compression refrigerant loop with the compressor 40 and condenser 42, connected to a refrigerant evaporator-to-water heat exchange 38. The apparatus also comprises an air to water contacting surface 36 mounted in an air duct 6. The surface 36 is mounted over or is otherwise adjacent to a condensate tray 8. The condensate tray 8 and the drain 22 from such tray 8 are suitably sized to handle the water 10 that circulates when the system is active. A water distributor 32 to create a distributed water flow 34 over the surface 6 is included. A blower 4 and an optional water droplet eliminator 12, downstream surface 6, complete the components in the air stream.

An optional ultraviolet light 16 for emitting UV radiation to eliminate harmful bacteria is shown in the water line downstream of the condensate tray 8. As stated above for the previous embodiment as shown in FIG. 1, the light could be mounted as shown or mounted in other positions in the water flow lines, or placed within air duct 6 downstream of the cooling coil. The light is optional since it is typically difficult for harmful bacteria to grow in flowing water systems with continual replenishment from condensation. An optional water filter 18 is shown after the pump. This filter can be located elsewhere in the water loop and may not be needed at all if the intake air is clean enough. An overflow drain 35 is provided at the desired water level in condensate trays to remove excess water accumulated in the system by condensation of water from the air at heat exchange surface 6. An optional drain valve 28 is included to drain water from the system if the system encounters freezing conditions and the system itself or individual system components are not specifically designed to handle the freezing of water. Finally, pump 30 is incorporated into the system for water circulation.

In operation, to cool an air stream, the compressor 40 and condenser 42 are activated along with pump 30 and blower 4. Pump 30 circulates water 10 around the secondary water loop through conduit 13. Water, cooled by the refrigerant evaporator to water heat exchanger 38 flows through pump 30 and has filterable impurities removed by flowing through filter 18. The water then flows to the distributor 32 and the distributed stream 34 passes over the air to water contacting surface 36 together with air from blower 4. The air is cooled as it passes over surface 36 to provide conditioned air exiting from duct 6. If the cold water temperature is below the dew point of the incoming air then additional water will also condense out onto surface 36. The cooled circulating water, plus any added condensed water, drains into condensate tray 8. The collected water flows out of the condensate tray 8 through the tray outlet 11, and into the conduit 13. The water flow is then contacted by ultraviolet radiation from an ultraviolet light 16 to eliminate any harmful bacteria. The cycle is then repeated. Since condensed water can be continually added to the system water inventory, an overflow discharge 35 from the condensate tray serves to remove this water. Finally, drain valve 28 remains closed during operation but can be used to drain the system of water if the possibility of freeze damage exists.

In other embodiments, it is understood that, although not shown in the Figures, the thermal store from FIG. 1 could be added to the water loop of FIG. 2 to allow air cooling, without the need to operate the vapor compressor refrigerant loop. A further thermal storage opportunity is also available for the embodiment of FIG. 2, for example, wherein the refrigerant evaporator to water heat exchanger 38 is designed to form ice on the refrigerant coils, with this ice performing the thermal storage function. In this instance, ice can be made without pump 30 operating if the ice is made at a time when air-cooling is not required.

As is apparent from the above descriptions, a majority of the cooling derived from the water loop is from the sensible heat in the water, with only a minority of the cooling being derived from the effects of water evaporation. For the purposes of this application, "majority" means greater than 50%. In reality, in the present invention, the sensible heat in the water is responsibly for greater than 80% of the cooling, and more preferably is responsible for greater than 90% of the cooling. It is further understood that conditions may exist whereby the preferred methods and apparatus of the present invention result in the sensible heat in the water being responsible for up to 100% of the cooling. This distinction sets the present invention apart from all methods known to date.

In the invention disclosed herein, the condensed water is used as the primary heat transfer fluid in both the charge and discharge between the thermal store and the air conditioning evaporator (water coupled store). For the embodiment as shown in FIG. 1, to charge the system the thermal storage unit is filled, preferably with distilled water or, in the alternative the air conditioning system is allowed to run and the condensed water fills the unit. The pump is activated to spray water uniformly over the evaporator and allow the cold water to exit in the same manner as condensed water would from the evaporator coils. According to conventional, known processes, ordinarily, condensed water from the evaporator is discarded from the system. However, according to the present invention, the exiting cold water is directed to the thermal store where heat is removed from the charging thermal storage media. The cycle of operations is continued until the store is fully charged. Excess water derived from the cooling of the inlet air to below its dewpoint is added to the water inventory and displaces an equivalent amount of water from the overflow. Therefore, according to the present invention, water is therefore continually replenished with fresh water. A typical residential, and indeed an automotive air conditioner can typically dedicate more than approximately 5000 Btu/hr to condensing water from the air, or approximately 5 pints of freshly condensed water per hour.

In general, therefore, circulating water is cooled by passing the water over the coils/fins of an operating evaporator. The water, in turn, removes heat from the thermal storage array to charge the system. While there is no restriction to charging at high blower speed, it would be more appropriate to charge when the air conditioning system cycles to low load, or is about to cycle off in the cooling of a building or vehicle.

In a building, for instance, electricity costs and air conditioning system efficiency greatly favors evening/night time charges. According to the present invention, according to one preferred embodiment, charging would therefore be timed for the evening. Whereas a typical evening operation would be "on" for 5–10 minutes and "off" for 10–20 minutes, the water circulation according to the present invention would start immediately at the end of this "on" cycle. The compressor would not stop, but would keep running to charge the store. The blower may or may not run during this charge cycle. When the thermostat called for more building cooling, the water flow would return to fall speed. The cycle of operation would continue until the store was fully charged. Note that during this process the compressor never needs to shut down for a major efficiency benefit since cycling losses would be greatly reduced.

In a vehicle, according to one preferred embodiment of the present invention, charging will occur typically after the initial cool-down has taken place and the air conditioning system is operating with excess capacity available. As above, the water circulation will occur when the air conditioning control system indicates that the cooling load from the vehicle cabin is reduced and/or the compressor is about to cycle off. Circulation will then occur until such time as the air conditioning system requires more "cool" in the cabin than the combination of charging and cabin cooling can be supplied by the air conditioner. At this point, the water flow to the store will be temporarily interrupted, to be restarted when charging capacity is again available. In this way, the compressor cycling losses can be avoided to a significant extent. Note again that in many instances it will be appropriate to circulate water and charge the storage system at the same time as, for example, the cabin is being cooled depending on total load and air conditioning system capabilities.

When the store is fully charged, the option then exists to: (1) turn off the circulating pump and allow the a/c system to revert to standard operation; (2) as in (1) but allow the pump to come on periodically to recoup any stand losses of storage capacity to the ambient; and (3) continue to use storage capacity to lengthen the off and on cycles of the compressor to minimize cycling losses.

According to preferred embodiments, the systems of the present invention do not rely on the evaporation of water to directly assist the charging of the store. For contrast, see for example, the systems disclosed in U.S. Pat. No. 5,056,588. Instead water is employed as a secondary heat transfer fluid between the store and the evaporator. In fact, according to the present invention, in the typical charging operation condensation is derived from the air, rather than causing water evaporation into the air.

The discharge cycle, according to the preferred embodiments of the present invention operates as follows. To achieve cooling without running the air conditioning system compressor, the blower is operated and the water-circulating pump is turned on. Cold water will then bathe the evaporator coil and will cool the air flowing through the coil/fins either directly from the water to the air or by cooling the coil/fins, which then cools the air. Cooled air is then circulated to the room/vehicle passenger compartment and the warmed water recirculated over the cool storage media to be re-cooled before again passing over the evaporator.

In some instances, such as pre-cooling of a hot vehicle it would be advantageous to initially spray a mist of water downstream of the evaporator to pre-cool the hot air ducts via evaporative cooling prior to or in conjunction with passing/recirculating cold water over the evaporator coil. In this preferred embodiment, a small amount of water will be lost to evaporation, but this amount will be reclaimed on the next charge or active air conditioning operation. Rather than spraying downstream of the evaporator, bathing the evaporator with ambient temperature water prior to cooled water will serve a similar function in cooling the air that flows through the evaporator. In this situation, system modification will be required to select warm or cooled water. If the store had not been charged or was fully discharged, then bathing the evaporator with water will provide effective evaporative cooling to the air flowing through the evaporator depending on the humidity content of the incoming air.

According to the present invention, the systems contemplated result in overall energy enhancement and pollution reduction. The use of the invention in conjunction with existing air conditioning systems reduces cycling losses on the air conditioning compressor, saving energy and wear and tear on the conditioning unit. With respect to the vehicle modifications resulting from the incorporation of the present invention, engine idling is reduced or eliminated while enabling occupants to keep cool when the vehicle is parked for short durations (about 5 to 10 minutes). In this embodiment, it is contemplated that only the blower and pump will engage, with the engine remaining off. In effect this allows one to "pre-cool" the car cabin before entering the car and starting the engine. In addition, the present invention maintains more desirable humidity levels within the passenger compartment during long journeys, and maintains more comfortable air discharge temperatures, without the present need for excess air-cooling followed by air re-heat.

The present invention is also environmentally advantageous as the invention facilitates "no-idle vehicle introduction" by continuing to provide cooling when the engine cycles off. Such advancements will become more useful if, for example, EPA regulations around the world, covering small particle emissions, further require future fuel-efficient "no-idle" strategies.

According to preferred embodiments of the present invention, the contemplated systems will typically be suitable for use with phase change materials having phase change temperatures between 40–60° F. Gas hydrates are one preferred choice for a cool storage material. Hydrates can be described as "warm ice", containing about 75% by weight water. Stated simplistically, this water freezes, similar to ice, but with small gas molecules trapped within the ice crystal structure. The trapped gas molecules stabilize the ice so that it melts at temperatures well above 0° C. For example 134$a$ and $CO_2$ hydrates are stable to about 10° C. Many gases form hydrates and a range of temperatures are available. Unlike ice, hydrates shrink when the starting liquid is frozen to a solid. This is a very important practical benefit. In addition, hydrates have very high discharge rates that are readily achievable from small systems. However, other cool storage materials could be used, including a mass of cold water alone as the storage system, or a mass of cold water in combination with an additional cool storage media mass.

Water flow rates will be dependent on efficiency of water distribution in the evaporator, efficiency of evaporator, and most importantly the charge or discharge rates desired. Assuming a 10° F. delta T in the water in and water out temperatures with flow rates typically between one-third and six gallons per minute, between about 1,500 and 30,000 Btu/hr would be delivered through the system. Obviously flow rates could range much higher or much lower depending on the selected system size.

As shown in the Figures there is only one pump and the store is gravity fed. This may be practical in some instances, but the present invention further contemplates also pumping fluid from the store, as would be readily understood by those skilled in the field of operational thermodynamics. Preferably, there should be little or no water building up under the evaporator coil. Therefore, the pump feeding the cool storage reservoir is preferably larger than the pump feeding the water distribution system over the evaporator. For example, two heads on the same motor would be preferred for some systems, although this is only one of several possible embodiments.

One preferred embodiment of the present invention is adaptable for a vehicle system. The thermal store is positioned below the air conditioning condensate drain. The condensate drain and lines to the store preferably handle greater than about 11 liters/minute of water flow (plus any entrained air), by gravity alone, with a minimal water head above condensate drain. Condensate, from the standard operation of the air conditioning system, drains out through the store by gravity. The water pump operates only when the cooler is charging or discharging. Control systems are used as would be readily understood by an engineer. One or more small vacuum pumps are placed in line that operate when the cooler is charging or discharging. The function of this pump is to create the head for water flow and remove air from the thermal store sump. This air reaches the sump by becoming entrained in the water flow line from the condensate tray down to the thermal store. If the accumulated air in the sump is not removed it will displace water into the condensate tray and water build-up here is undesirable. In addition to air, condensed water also needs to be removed. This is especially true during long charging cycles. To fulfill these functions the small vacuum pump has to be capable of handling water and water-air mixtures as well as air alone. A 1.5 l/min free airflow capacity pump that will pull a 30 cm of mercury vacuum at no flow is particularly preferred. It is possible to eliminate a plurality of pumps by periodically stopping the pump during the charging/discharging operation and allowing the system to equilibrate. The frequency of flow interruption is system dependent and determines the applicability of this approach. Other pump combinations that ensure a "dry" condensate tray are equally applicable. The system preferably employs a flap check, or similar type valve, preferably at the system vent. As mentioned above, control systems, which may be computer assisted, are employed as would be readily understood.

FIG. 1 shows a spray or mist of water distributed evenly over the evaporator coils. While this is a preferred embodiment, the present invention contemplates any useful means of distributing an even volume of water over the evaporator. For example, a water slinger could be used, or a distribution manifold system can be equally as effective or even more effective in achieving even distribution. A water distribution manifold was found to be very efficient at delivering a uniform water distribution for the company vehicle type evaporator. Thin walled aluminum tubes (³⁄₁₆" OD) were extended down every other plate of the plate and fin evaporator at the air inlet face of the evaporator. The tubes were sealed at one end and 0.025" openings were drilled every 0.125" down the tube length. The openings were oriented towards one set of adjacent fins. Nine such tubes connected to a water feed manifold constituted the distribution system and evenly distributed flow at flow levels of from about 2 to about 3 gpm.

As shown in FIGS. 1 and 2, a filter filters out any contamination that finds its way into the circulating water. As well as helping keep the water clean, this filter will also protect any fine spray nozzles or fine distribution manifold openings from being plugged. The filter can also reside in the water flow lines or the reservoir itself depending on the system design. In some instances a filter may not be required at all.

A screen to remove any entrained water droplets in the air stream exiting the evaporator is also shown in FIGS. 1 and 2. This again may or may not be required depending on air velocities, air flow path and evaporator design. Overspray was easily eliminated with a barrier of 0.2" thick open cell a/c filter mat. This mat impacted the flow rate by less than about a 5 cfm reduction at the 150 cfm level. The barrier was mounted on a frame and held about 2½" away from the outlet face of the evaporator. In general, however, the more uniformly the water is distributed over the evaporator surface, the less the likelihood of overspray. While overspray was noted in several tests at high airflow rates, it was generally due to poor water distribution. Correcting this distribution took care of the overspray, without having to resort to a spray elimination barrier.

A UV light is shown in FIGS. 1–2 in the feed line to the thermal store. The light could be in the evaporator compartment or in the store itself or indeed in several locations depending on system configuration. Lights emitting UV radiation have been used for decades to inhibit microbe growth in water or in wet compartments like an evaporator compartment and are very effective. With the water turnover through the store from an air conditioning system, it is quite likely that there will not be a microbe build-up in a standard air conditioning system with no store attached. Therefore, a UV light may not be necessary for all embodiments of this invention. Other purification techniques such as ozone treatment could also be used if required.

The following examples found throughout this specification are provided for illustrative purposes only and are not intended to limit the scope of the invention.

EXAMPLE 1

To get a baseline the company test vehicle was run from Jun. 7, 1999, to Oct. 7, 1999, with an operational water coupled store. There was no treatment of the water except the continuous replacement of the water with condensate from the a/c system. On Oct. 7, 1999 samples were taken and the water analyzed for bacteriological count. The analysis showed the water still to be of drinking water quality at the end of the test even though no microbial growth inhibitor was used.

Since water is used in the flow lines and within the store itself, provisions need to be made to handle winter environments. Typically this will not be a problem with any phase change material used in the system. For example, if gas hydrates are used then the hydrate containment means will be designed for repeated freezing and melting, but the potential freezing and expansion of the water heat exchange fluid need to be handled. This can be accomplished in several ways.

The unit can be drained leaving no water to freeze within the store or lines. A freeze drain valve is one automatic way of achieving the draining. See, for example, U.S. Pat. No. 4,296,770. However, a manual valve could be equally as effective. In many instances automatic draining can simply be achieved by operating the system at the low humidity levels common throughout the country during the cold weather. Evaporative cooling will deplete the store of water, and the a/c system will be required infrequently and will not replenish the loss. As the weather warms up, dew points rise, the store will refill and normal operation will be restored. During the cold weather period outside air alone, blown into the vehicle, will be well able to precool or maintain cooling for a vehicle with the engine off.

In situations where the store is used within a building or other heated location then no special precautions need be taken. In one embodiment, it is preferred that the system design allows all the water in the lines to fully drain back into the thermally insulated store. This will greatly increase the time that the system has to be below 0° C. before significant water freezing occurs. This time can be extended further, or indefinitely, by warming the store from another heat source when winter conditions require such. In addition, the store can be designed with enough free space to accommodate the expansion due to ice formation for a freeze safe package. Flexible sides on the store could also assist in containing any expansion.

The present invention is not limited to any particular applications. Indeed in addition to automobiles and buildings, the present invention can find usefulness incorporated into any environment that needs climate control, including railway cars, boats, campers, planes, buses and trucks, etc. A truck sleeper system may comprise two evaporators; one to dedicated to the cab compartment, and the other dedicated to the sleeper compartment. These systems may require a slightly different water management technique than depicted in the Figures. While the truck is on the highway the sleeper may be unoccupied and little or no air is circulated over the rear evaporator during vehicle a/c operation. In this instance, the bulk of the excess water available will be from the cab a/c unit and this should be ducted to the store to provide continuous fresh water through the store. Charging and discharging could then be accomplished by spraying over the evaporator in the sleeper compartment.

For sleeper trucks without a rear evaporator, the main cab evaporator can be used to cool a distributed water flow over the evaporator, and then use this water to remove heat from a cool storage reservoir. If the sleeper was cooled (and probably heated) via air from the front a/c system, then distributing water over the evaporator from the store will cool the air for the sleeper in a manner similar to that previously discussed. However, if the truck has a rear heater core but no rear evaporator, then after-charging the store from the front evaporator cooling of the sleeper can be accomplished with the engine off. Here cold water from the store is distributed over the outside of the heater core to cool air blown through the core. A water return path to the store is needed. With the engine running, this circulation system could also generate cold water at the active evaporator and recirculate this cold water over the sleeper heater core to cool the air in the sleeper box while the truck is operational. No second evaporator is required in the sleeper box compartment. In this instance, the engine coolant flowing through the heater core needs to be valved off.

Similarly, water over an extended surface, air flowing through the extended surface and the water being recirculated offers additional advantages. The water can act as the heat exchange fluid in a secondary fluid air conditioning system. Refrigerant gas is used in one loop to chill the water using a heat exchanger while the chilled water is caused to recirculate over the extended surface in direct contact with the air that is to be conditioned. This operation can be accomplished with or without cool storage, depending on the specific application. As long as the cold water is at a temperature below the dew point of the incoming air there will be a net gain of recirculating water in the open loop. In addition to simplicity, low cost and water washing of the air for pollutant removal from the air, this system provides the most benign method of heat transfer of fluids for use in air conditioning. Still further, since the system of the present invention is outside of the occupied space, the primary refrigerant loop can more safely use flammable or more noxious refrigerants such as hydrocarbons and ammonia respectively.

There may be several occasions when a driver, for instance, wants fresh air into the vehicle without air conditioning but knows he/she will need cool air later in the day and wishes to charge the storage unit. According to a preferred embodiment of the present invention, this can easily be accomplished by turning the a/c on with little or no airflow, and then operating the water circulating system over the evaporator and back to the store. In this manner the a/c system will charge the store while the driver is free to open the vehicle windows for fresh air. The same will be true for buildings with the windows open.

EXAMPLE 2

A system was set-up to test a Jeep evaporator under both flowing air and water distributed over the evaporator. The evaporator was set-up so that flowing refrigerant through it would yield an evaporator out temperature of about 40° F. The Jeep evaporator is of the "plate and fin" type with slotted fins. The unit comprised nineteen vertical plates to the inlet and outlet headers on the top with horizontal slotted fins between each of the vertical plates. To distribute water uniformly over the finned surfaces, three ½" OD nylon tubes were arranged horizontally with centers ½" 3" & 5½" from the top of the fins. The tubes were held about 0.25" away from the fins. At this closest point 19×0.089" diameter orifices were arranged on each tube. Each orifice on each tube directly fed over the 0.25" gap, into a section of fins defined by the vertical plates. The water was fed on the air inlet side of the evaporator and drained out at the bottom on the air outlet side of the evaporator. Excellent sheeting action was achieved by this distribution means. The water flow rate was set at 3 gallons per minute. The unit was set up in a Plexiglas box so flow could be observed. Excellent sheeting action for the water over the evaporator was observed, even with no airflow. Airflow was reduced from 180 cfm airflow with dry evaporator to 160 cfm air flow with 3 gallons/min water flowing over evaporator. Significant overspray was noted at the 160 cfm flow rate. No overspray was noted at the 100 cfm flow rate. Following this test, water distribution modification was made to allow airflow rates of 200 cfm without overspray. The heat exchanger with water flowing over the surface was highly effective in transferring heat from air to water on discharge. With a 40° F. refrigerant out temperature, substantial heat could be transferred from the water to the refrigerant while still cooling the air.

| | |
|---|---|
| Air in = 76.3° F. | |
| Air out = 48.5° F. | ~4700 Btu/hr to the air |
| Water in = 58.7° F. | |
| Water out = 50.5° F. | ~12,300 Btu/hr to the store |

This result shows the potential of using the full capacity of the a/c system when cooling the air only requires a fraction of the available capacity. This will allow rapid charging of a thermal store. It also demonstrates how the store can be used to eliminate the excessive compressor cycling that would be required if a 24,000 Btu/hr compressor was only required to deliver 4,700 Btu/hr sensible cooling plus a modest latent load.

EXAMPLE 3

The water coupled storage system with gas hydrate as the primary cool storage media was incorporated into the company vehicle using the system described in Example 2. The system performed very well in the charging and pre-cooling tests undertaken. The results are shown graphically as Jeep Charge #3 and Jeep Discharge #3 (FIGS. 3 and 4 respectively). The control logic for such charge and discharge operation is shown in FIGS. 5 and 6.

The water coupled store of the present invention provides a low cost, efficient system for rapidly reducing the ambient temperature of ambient air in a vehicle or building using an environmentally safe water loop that never needs replenishing. The benefits of evaporative cooling are available to the system even when the cool store is exhausted. In addition the water loop "washes" the air it comes into contact with, thus offering an air purification system that reduces pollutants. A small photovoltaic system can power the blower to keep blowing a small volume of ambient air through the vehicle air duct system during a stand period. This will keep the ducts cooler and as such require less cooling or yield a better cooling effect from the thermal store. The present invention further contemplates cooling any manner of physical objects with the cold water flow conductively, for example a steering wheel, seats, etc.

As mentioned above, in one embodiment the water couple thermal storage of the present invention can be adapted for use with large trucks with sleeper compartments alone, or in combination with an air heater. Such an arrangement yields the lowest possible cost (no valves, vacuum pump glycol, etc.), while providing an exceedingly fast cool charge capability (2–3 hours). In addition, the ease with which the present system can retro-fit any existing air conditioning assembly makes it an ideal addition for and vehicle building or vehicle. As also mentioned earlier, the circulated air has its purity enhanced. With a water coupled unit the sleeper air will be constantly water wash purified to the benefit of the driver over conventional systems. The water used will be continually cleaned by continually replacing with filtered condensed water from the front heat exchanger when the truck is driven with the a/c operational. A small bypass flow loop through a carbon filter and/or a UV pencil light could also be added to the water circulation loop to further enhance the ultimate quality of the air. In addition, control settings can enable the system of the present invention to charge, for example, only when the a/c is on and the evaporator out temperature is below 48° F. This requires only one control thermistor and effectively prevents the storage system from charging when all available cooling is directly required for the passenger compartment. In this situation, charging is started and stopped by simply operating or not operating the small water-circulating pump.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for cooling an air stream comprising the steps of:
   providing a thermal storage reservoir having an inlet and an outlet, said reservoir comprising a thermal storage mass;
   providing a thermally conductive heat exchanger having a heat exchanger inlet and a heat exchanger outlet, said heat exchanger inlet and heat exchanger outlet directing an airflow through the heat exchanger;
   providing a primary water loop having an amount of water directed through a conduit, said conduit in communication with the thermal storage reservoir;
   providing a fluid disperser having a disperser inlet and a disperser outlet, said disperser inlet in communication with the conduit such that water in the water loop is directed from the reservoir to the disperser inlet;
   dispersing water from the conduit through the disperser outlet and onto an outer surface of the heat exchanger;
   reclaiming water from the surface of the heat exchanger and directing the reclaimed water to the reservoir; and
   providing said airflow having a first temperature in the direction of the heat exchanger and past the heat exchanger such that the air after passing the heat exchanger has a second temperature lower that the first temperature.

2. The method according to claim 1, wherein the water loop is an open water loop.

3. The method according to claim 1, wherein the lower air temperature is caused by the sensible heat in the water.

4. The method according to claim 1, further comprising a blower to assist in creating the airflow.

5. The method according to claim 4, wherein the blower is connected to a power source capable of powering the blower.

6. The method according to claim 1, wherein the disperser comprises a manifold having openings through which water is directed to the heat exchanger.

7. The method according to claim 1, further comprising the step of providing a pump to pressurize the water loop in the direction of the disperser.

8. The method according to claim 1, further comprising a sterilizer for purifying the water in the water loop.

9. The method according to claim 8, wherein the sterilizer is an UV lamp.

10. The method according to claim 1, further comprising the step of providing a filter in communication with the conduit.

11. The method according to claim 1, further comprising the step of providing a control for controlling the flow of water in the water loop.

12. The method according to claim 1, wherein the lower temperature of the air is due to a cooling effect from the water, a majority of the cooling effect derived from the sensible heat in the water, and a minority of the cooling effect is from water evaporation.

13. The method according to claim 1, wherein the thermal storage reservoir comprises a thermal storage mass.

14. The method according to claim 13, wherein the thermal storage mass is a phase change material.

15. The method according to claim 14, wherein the phase change material is a gas hydrate.

16. The method according to claim 1, wherein the thermal storage mass is water.

17. The method according to claim 1, wherein the heat exchanger is an evaporator.

18. The method according to claim 17, wherein the evaporator is an air conditioning evaporator.

19. An apparatus for cooling air comprising:
    a thermal storage reservoir having an inlet and an outlet, said reservoir comprising a thermal storage mass;
    a thermally conductive heat exchanger having and outer surface and an inlet and an outlet, said inlet and outlet directing the an airflow into and out from the heat exchanger;
    a primary water loop having an amount of water directed through a conduit inlet into a conduit, said conduit in communication with the thermal storage reservoir;
    a fluid disperser in having a disperser inlet and a disperser outlet, said disperser in communication with the conduit such that water in the water loop is directed from the reservoir outlet to the disperser inlet;
    a blower for creating said airflow having a first temperature, said airflow directed in the direction of the disperser and past the heat exchanger such that the airflow has a second temperature after passing the heat exchanger that is less than the first temperature; and
    a collector for collecting water from the outer surface of the heat exchanger, said collector in communication with the conduit inlet.

20. The apparatus according to claim 19, wherein the water loop is an open water loop.

21. The method according to claim 19, wherein the disperser comprises a manifold having openings through which water is directed to the heat exchanger.

22. The apparatus according to claim 19, further comprising a pump to pressurize the water loop in the direction of the disperser.

23. The apparatus according to claim 19, further comprising a sterilizer for purifying the water in the water loop.

24. The apparatus according to claim 23, wherein the sterilizer is an UV lamp.

25. The apparatus according to claim 19, further comprising a filter in communication with the conduit.

26. The apparatus according to claim 19, wherein the blower is connected to a power source capable of powering the blower.

27. The apparatus according to claim 19, further comprising a control for in communication with the pump controlling the flow of water in the water loop.

28. The apparatus according to claim 19, wherein the thermal storage reservoir comprises a thermal storage mass.

29. The apparatus according to claim 28, wherein the thermal storage mass is a phase change material.

30. The apparatus according to claim 29, wherein the phase change material is a gas hydrate.

31. The apparatus according to claim 19, wherein the thermal storage mass is water.

32. The apparatus according to claim 19, wherein the heat exchanger is an evaporator.

33. The apparatus according to claim 32, wherein the evaporator is an air conditioning evaporator.

34. The apparatus according to claim 19, further comprising a drain for draining water from the water loop.

35. A building comprising the apparatus of claim 19.

36. A vehicle comprising the apparatus of claim 19.

37. The vehicle according to claim 36, wherein the vehicle is selected from the group consisting of planes, trains, trucks, automobiles, campers and boats.

38. A method for cooling an air stream comprising the steps of:

providing a primary refrigerant loop containing refrigerant, said refrigerant loop comprising a heat exchanger having a heat exchanger inlet and a heat exchanger outlet, said outlet in communication with a first conduit in communication with the heat exchanger outlet to a compressor and a condenser and a heat exchanger inlet;

providing a secondary water loop having an amount of water directed through a second conduit, said conduit in communication with the heat exchanger;

providing a fluid disperser having an disperser inlet and a disperser outlet, said disperser provided in communication with the second conduit such that water in the secondary water loop is directed from the heat exchanger to the disperser inlet;

dispersing water from the conduit through the disperser outlet and onto the surface of the heat exchanger;

providing a thermally conductive water contacting surface proximate to the disperser outlet;

providing an airflow having a first temperature in the direction of the water contacting surface and past the water contacting surface, such that the airflow after passing the water contacting surface has a second temperature lower that the first temperature; and reclaiming water from the surface of the water contacting surface and directing the reclaimed water to a second water loop inlet.

39. The method according to claim 38, wherein the secondary water loop is an open water loop.

40. The method according to claim 38, wherein the second airflow temperature is caused by the sensible heat in the water.

41. The method according to claim 38, further comprising a blower to assist in creating the airflow.

42. The method according to claim 41, wherein the blower is connected to a power source capable of powering the blower.

43. The method according to claim 38, wherein the disperser comprises a manifold having openings through which water is directed to the water contacting surface.

44. The method according to claim 38, further comprising the step of providing a pump to pressurize the secondary water loop in the direction of the disperser.

45. The method according to claim 38, further comprising a sterilizer for purifying the water in the water loop.

46. The method according to claim 45, wherein the sterilizer is an UV lamp.

47. The method according to claim 38, further comprising the step of providing a filter in communication with the conduit.

48. The method according to claim 38, further comprising the step of providing a control for controlling the flow of water in the water loop.

49. The method according to claim 38, wherein the lower temperature of the air is due to a cooling effect from the water, a majority of the cooling effect derived from the sensible heat in the water, and a minority of the cooling effect is from water evaporation.

50. The method according to claim 38, further comprising the step of providing a thermal storage reservoir in communication with the secondary water loop.

51. The method according to claim 50, wherein the thermal storage reservoir comprises a thermal storage mass selected from the group consisting of gas hydrate and water.

52. The method according to claim 38, further comprising the step of providing a thermal storage reservoir in communication with the primary refrigerant loop.

53. The method according to claim 52, wherein the thermal storage reservoir comprises a thermal storage mass selected from the group consisting of gas hydrate and water.

54. The method according to claim 38, wherein the wherein the water contacting surface is an evaporator.

55. An apparatus for cooling air comprising:

a primary refrigerant loop containing an amount of refrigerant, said refrigerant loop comprising a heat exchanger having a heat exchanger inlet and a heat exchanger outlet, said outlet in communication with a first conduit, said first conduit in communication with the heat exchanger outlet, a compressor, a condenser and a heat exchanger inlet;

a secondary water loop having an amount of water directed through a second conduit, and through the heat exchanger;

a fluid disperser having an disperser inlet and a disperser outlet, said disperser in communication with the second conduit such that water in the secondary water loop is directed from the heat exchanger to the disperser inlet;

a thermally conductive water contacting surface located proximate to the disperser for receiving water dispersed thereon from the disperser outlet and onto the surface of the water contacting surface;

a blower for creating an airflow, said airflow having a first temperature in the direction of the water contacting surface and past the water contacting surface, such that the airflow after passing the water contacting surface has a second temperature lower that the first temperature; and a collector for reclaiming water from the surface of the water contacting surface, said collector in communication with the secondary water loop conduit.

56. The apparatus according to claim 55, wherein the secondary water loop is an open water loop.

57. The apparatus according to claim 55, wherein the disperser comprises a manifold having openings through which water is directed to the water contacting surface.

58. The apparatus according to claim 55, further comprising a pump to pressurize the secondary water loop in the direction of the disperser.

59. The apparatus according to claim 55, further comprising a sterilizer for purifying the water in the secondary water loop.

60. The apparatus according to claim 59, wherein the sterilizer is an UV lamp.

61. The apparatus according to claim 55, further comprising the step of providing a filter in communication with the conduit.

62. The apparatus according to claim 55, wherein the blower is connected to a power source capable of powering the blower.

63. The apparatus according to claim 55, further comprising a control for controlling the flow of water in the secondary water loop.

64. The apparatus according to claim 55, further comprising a thermal storage reservoir in communication with the secondary water loop.

65. The apparatus according to claim 64, wherein the thermal storage reservoir comprises a thermal storage mass selected from the group consisting of gas hydrate and water.

66. The apparatus according to claim 55, further comprising a thermal storage reservoir in communication with the primary refrigerant loop.

67. The apparatus according to claim 66, wherein the thermal storage reservoir comprises a thermal storage mass selected from the group consisting of gas hydrate and water.

68. The apparatus according to claim 55, wherein the wherein the water contacting surface is an evaporator.

69. A building comprising the apparatus of claim 55.

70. A vehicle comprising the apparatus of claim 54.

71. The vehicle according to claim 70, wherein the vehicle is selected from the group consisting of planes, trains, trucks, automobiles, campers and boats.

\* \* \* \* \*

UNITED STATES PATENT AND TRADEMARK OFFICE
CERTIFICATE OF CORRECTION

PATENT NO. : 6,408,633 B1
DATED : June 25, 2002
INVENTOR(S) : Carr

It is certified that error appears in the above-identified patent and that said Letters Patent is hereby corrected as shown below:

Column 16,
Line 21, cancel "the" (first occurrence)

Column 20,
Line 7, "claim 54" should read -- claim 55 --.

Signed and Sealed this

Twelfth Day of November, 2002

Attest:

Attesting Officer

JAMES E. ROGAN
Director of the United States Patent and Trademark Office